Figure 1:
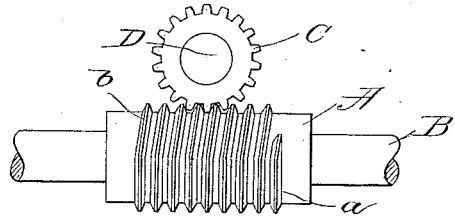

(No Model.)

W. F. BEARDSLEE.
WORM GEARING.

No. 336,200. Patented Feb. 16, 1886.

Witnesses
Fred L. Emery
John F. C. Reinkirk

Inventor
William F. Beardslee
by Crosby & Gregory attys.

N. PETERS. Photo-Lithographer, Washington, D. C.

UNITED STATES PATENT OFFICE.

WILLIAM F. BEARDSLEE, OF BOSTON, MASS., ASSIGNOR TO THE MANUFACTURERS' SPECIAL MACHINE COMPANY, OF DANBURY, CONN.

WORM-GEARING.

SPECIFICATION forming part of Letters Patent No. 336,200, dated February 16, 1886.

Application filed April 27, 1885. Serial No. 163,567. (No model.)

*To all whom it may concern:*

Be it known that I, WILLIAM F. BEARDSLEE, of Boston, county of Suffolk, State of Massachusetts, have invented an Improvement in Worm-Gearing, of which the following description, in connection with the accompanying drawings, is a specification, like letters on the drawings representing like parts.

This invention has for its object the production of a novel worm for the conversion of a uniformly rotating motion into an intermitting rotary motion.

My invention consists, essentially, in a worm having irregular teeth or teeth varying in pitch in each round, the portions of the round of teeth of greatest pitch producing the maximum speed in the worm-gear and shaft with which it is connected, while the portions of the round of teeth of least pitch determine the slowest or minimum speed of the said worm-gear and shaft, the nearer the teeth of the least pitch to a right angle to the axis of rotation of the worm or the driving-shaft carrying it the less the speed of the driven shaft, the number of degrees through which the worm-gear and its shaft are rotated at their fastest speed at each complete rotation of the worm depending upon the extent or pitch about the worm of the threads of greatest pitch.

In my improved worm the threads extended about a portion of the circumference are substantially annular, or with no or very little pitch, and the threads at other portions of the circumference start from one end of the annular threads; but as the portions of the thread having pitch to establish the kind or character of the screw cover less than the full circumference of the worm, it is obvious that the pitch, if made regular, would not meet the end of the next annular portion of the thread, and hence it becomes necessary to provide additional threads, there being two, three, or more additional threads, according to the distance it is desired to turn the worm-gear at each rotation of the worm, increase in the number of threads also correspondingly increasing the difference in speed between the worm and the worm-gear.

If the movement to be imparted by my improved worm-gear is to be that usually derived from a screw of regular pitch, it having, say, four threads to the inch, it is necessary to provide the worm with eight threads to the inch, provided the worm-gear is to rest during one-half rotation of the worm, for it will be noticed that the portions of the threads having pitch extend for but half-way about the circumference of the worm, and consequently the portions of the threads having pitch would fall between those portions of the thread without pitch, and consequently to provide a continuous thread it is necessary to add a second thread, which pieces out the first thread.

The increase in the number of threads to keep them continuous will depend upon the extent of the periphery of the worm occupied by the portions of the thread having pitch and upon the steepness of the pitch.

Figure 2:
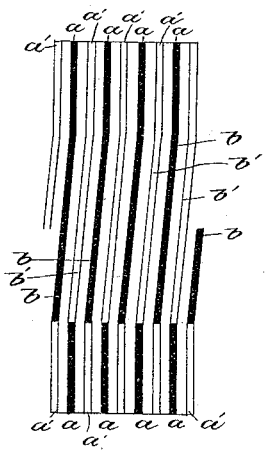

Figure 1 in elevation represents a rotating shaft provided with a worm embodying my invention, the said worm engaging a worm-gear on a second shaft, and Fig. 2 shows my improved worm developed, the particular worm herein shown having two threads, each of which is shown by different lines in order to the better illustrate them and their junction.

The shaft B, rotated in any usual way, and called the "driving-shaft," has fast upon it my improved worm A, having a series of teeth, $ab$ and $a'b'$, that engage the teeth of the worm-gear C, fast on the shaft D. The shaft B will be rotated continuously in one direction, taking the worm positively with it; but, owing to the construction of the said worm, the speed of the shaft D will be varied during each rotation.

The portions $a$ of the teeth of the worm are nearly at or they may be at right angles to the axis of its rotation, the variation of the said portions from a position at right angles to the axis of rotation of the said worm depending upon whether the shaft D is or is not to come to a full rest once during each complete rotation of the worm, slight variations of the portions $a$ from true right-angular position determining the minimum speed of the shaft D and the extent to which the minimum speed of rotation of the shaft D is to be effective.

The portions $b$ of the threads of the worm which are set at the greatest pitch when in engagement with the teeth of the worm-gear rotate the latter and its shaft D at the maximum speed and determine the class or character of the worm. If the portions a extended about the hub A for one hundred and eighty degrees, and were at right angles to the center of the hub A, the worm-gear C would remain at rest during each half rotation of the worm, and would be rotated during the other half rotation of the said worm, or while the pitch-threads b are in engagement with the worm-gear.

Referring to Fig. 2, it will be noticed that the threads a a are four to the inch, and as the portions b of the threads having pitch occupy but one hundred and eighty degrees of the circumference of the worm the ends of the portions b fall midway between the ends of the portions a, which it is obvious would not be practicable; but to overcome this I add to the circumference of the worm extra threads $a'b'$, corresponding in shape with and parallel to the threads $a b$, the second threads, $a'b'$, so added piecing out and connecting as one thread the ends of the threads $a b$. The number of what I call "extra" threads to be added will, therefore, it is obvious, be increased in proportion to the movement desired to produce by the worm for a partial rotation, the greater the movement required in a short arc the greater the number of threads to be added to piece out the thread which denominates and controls the extent of movement to be given to the worm-gear.

I claim—

1. A worm provided with teeth of irregular or different pitch, substantially as described.

2. A worm provided at a portion of its periphery with threads having a regular established pitch, the said threads about another portion of the periphery of the said worm being uniform, but of a pitch differing from the portions of the threads of greatest pitch, substantially as described.

3. A worm having portions of its teeth substantially at right angles to its axis of rotation, and other portions set to a pitch or to form pitch-teeth, substantially as described.

4. The herein-described worm-gearing, consisting of a rotating shaft, B, provided with a worm having annular teeth $a$ and pitch-teeth $b$, combined with a worm-gear and the shaft to which it is attached, substantially as described.

In testimony whereof I have signed my name to this specification in the presence of two subscribing witnesses.

WILLIAM F. BEARDSLEE.

Witnesses:
G. W. GREGORY,
B. J. NOYES.